June 22, 1926.

F. R. MOE

WORK GUIDE FOR RIPPING TABLES

Filed Sept. 24, 1925

1,589,413

Inventor
F. R. Moe,
By Clarence A. O'Brien
Attorney

Patented June 22, 1926.

1,589,413

UNITED STATES PATENT OFFICE.

FRANK R. MOE, OF BLOOMER, WISCONSIN.

WORK GUIDE FOR RIPPING TABLES.

Application filed September 24, 1925. Serial No. 58,336.

The present invention relates to a work guide for ripping tables, and has for its principal object to provide a carriage movable in a track way for the purpose of cutting gothic rafters for barn and other buildings, or for cutting any lumber in a convex or concave form.

Another important object of the invention is to provide a device of this nature including an adjustable track way wherein the curvature thereof may be changed as desired and a carriage also capable of having its curvature changed to be concentric with the curvature of the track-way.

Another important object of the invention is to provide a device of this nature which is exceedingly simple in its construction, strong, durable, efficient and reliable in operation, easy to manipulate, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawing:—

Figure 1:
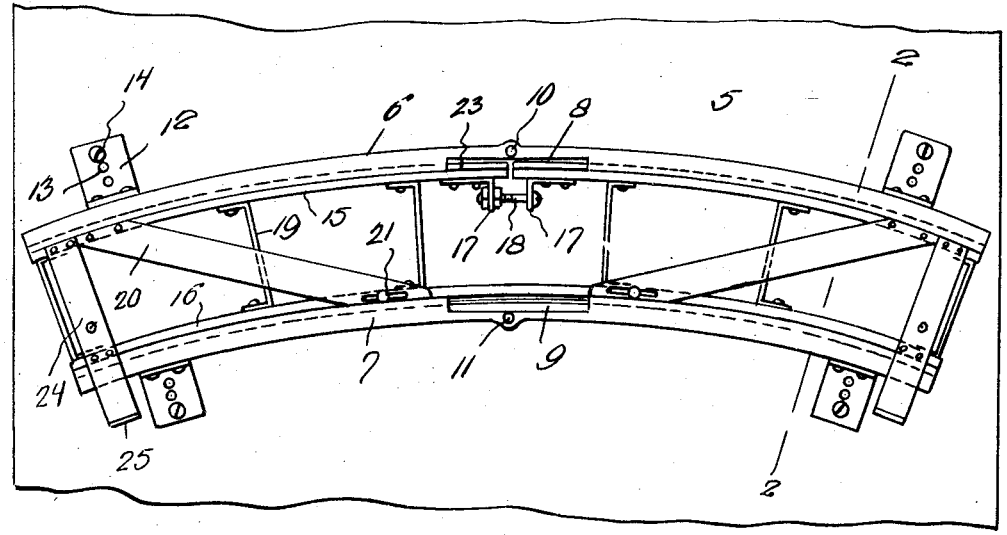
Figure 1 is a top plan view of the apparatus mounted on a ripping table.

Referring to the drawing in detail it will be seen that 5 designates the top of a ripping table. Any saw table may be used. My invention does not lie in the table but in the attachment about to be described, regardless of the particular formation of said table.

Figure 2:
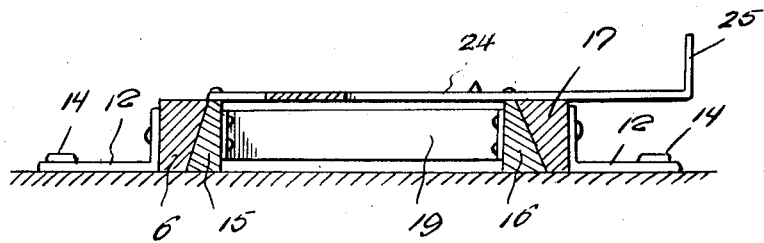
Figure 2 is a transverse section taken therethrough substantially on the line 2—2 of Figure 1.

Referring to the attachment it will be seen that the numerals 6 and 7 designate a pair of track bars forming a track way. These track bars 6 and 7 are constructed of resilient material, preferably spring steel. The inner sides of the bars 6 and 7 are beveled to form a dove tail way as is illustrated to advantage in Figure 2. The inner side of the intermediate portion of the track bar 6 is cut away to form the notch 8. The track bar 7 is similarly cut away at 9. Pivot members 10 and 11, extend upwardly from the table 5 through the centers of the bars 6 and 7. Angle brackets 12 are engaged with the ends of the bars 6 and 7 on their outer sides, and the lower arms thereof are provided with pluralities of apertures 13, so that screws 14 may be engaged therewith. By removing the screws 14 the curvature of the bars 6 and 7 may be changed as desired and the screws placed back in the proper apertures 13.

Referring now particularly to the carriage which is slidable in the track way it will be seen that numerals 15 and 16 designate the two carriage bars which have their outer sides beveled so that the carriage is dovetailed for sliding in the dove tailed way formed by the track way. The bar 15 is formed in two sections. Angle brackets 17 are attached to adjacent ends of the sections of the bar 15. An adjustment bolt 18 connects the angle brackets 17 together. Resilient cross braces 19 are disposed between the carriage bars 15 and 16. A pair of diagonal brace bars 20 have one end fixed to the bar 15 adjacent its ends, and the other ends of these brace bars 20 have a pin and slot connection 21 with the intermediate portion of the bar 16.

The rip saw extends through the opening 23 provided in the ripping table 5. I have not shown the ripping saw since the same is very well known in this art.

In using the apparatus, the curvature desired is first ascertained and the trackway bars 6 and 7 are accordingly adjusted by proper manipulation of the screw 14 in conjunction with the brackets 12. The adjustable bolt 18 is loosened and the carriage is placed in the trackway, thereby attaining the same curvature as said trackway, after which the adjustable bolt 18 is tightened so that the carriage will maintain the proper curvature. The carriage is then slid out of the track way and the work in the form of a board or the like is rested on the track way by means of bracket 24 extending transversely of the ends of the bars 15 and 16 and extending beyond the bars 16 and terminating in upstanding extensions 25. The carriage is then moved inwardly of the track way, and as will be apparent, the saw will engage the board and cut the same at the desired curvature.

The construction, utility, and advantages of the invention should now be clearly understood without a more detailed description thereof.

The present embodiment of the invention has been disclosed merely by way of example since in actual practice it attains the features of advantage enumerated as desirable in the statement of the invention, and the above description. It will be apparent that changes in the details of construction and in the combination and arrangement of parts may be resorted to without departing from the spirit or scope of the invention as hereinafter claimed or sacrificing any of its advantages.

Having thus described the invention, what I claim as new is:—

1. In combination, a track way formed from a pair of resilient track bars, means for adjusting the curvatures of said track bars, a carriage slidable in the track way and including a pair of carriage bars, means for adjusting the curvature of said carriage bars, means for holding work on said carriage bar, and a plurality of transverse resilient brace bars between the carriage bars.

2. In combination, a track way formed from a pair of resilient track bars, means for adjusting the curvatures of said track bars, a carriage slidable in the track way and including a pair of carriage bars, means for adjusting the curvature of said carriage bars, means for holding work on said carriage bar, a plurality of transverse resilient brace bars between the carriage bars, and a pair of diagonal brace bars attached to one carriage bar adjacent its ends and having a pin and slot connection with the other carriage bar adjacent its center.

3. In combination, a pair of track bars, means for pivoting the centers of said track bars to a ripping table, means for adjusting the ends of said track bars so as to adjust the curvatures thereof, a carriage slidable between the track bars, said carriage including a pair of bars, one of said bars of the carriage being formed in two sections so as to permit adjustment of the carriage to conform to the curvature of the track bars, brackets on the adjacent ends of said sections, an adjustment bolt engaging said brackets, braces between the carriage bars, and additional diagonal braces between the track bars fixed to the sections of one carriage bar and having a pin and slot connection with the other carriage bar.

4. In combination, a track way, means for adjusting the curvature of said track way, a carriage slidable in the track way and including a pair of bars, one of said bars being formed in two sections to permit adjustment of the carriage to conform to the curvature of the track way, brackets at the adjacent ends of said sections, an adjustment bolt engaging said brackets.

5. In combination, a track way, means for adjusting the curvatures of said track way, a carriage slidable in the track way and including a pair of bars, one of said bars being formed in two sections to permit adjustment of the carriage to conform to the curvature of the track way, and means between the adjacent ends of said sections for adjusting them in relation to each other.

In testimony whereof I affix my signature.

FRANK R. MOE.